(12) United States Patent
Kang et al.

(10) Patent No.: US 7,940,481 B2
(45) Date of Patent: May 10, 2011

(54) ZOOM LENS MODULE

(75) Inventors: Kyong Rok Kang, Suwon-si (KR);
Young Min Seo, Seongnam-si (KR);
Byeong Hyeon Yu, Seoul (KR)

(73) Assignee: Samsung Electronics Co., Ltd.,
Gyeonggi-do (KR)

( * ) Notice: Subject to any disclaimer, the term of this patent is extended or adjusted under 35 U.S.C. 154(b) by 0 days.

(21) Appl. No.: 12/659,434

(22) Filed: Mar. 9, 2010

(65) Prior Publication Data
US 2010/0259836 A1    Oct. 14, 2010

(30) Foreign Application Priority Data

Apr. 13, 2009  (KR) .................. 10-2009-0031835

(51) Int. Cl.
*G02B 7/02* (2006.01)
(52) U.S. Cl. ....................................... 359/823; 359/824

(58) Field of Classification Search .................. 359/823, 359/824, 829
See application file for complete search history.

(56) References Cited

U.S. PATENT DOCUMENTS 4,498,759 A * 2/1985 Ogawa et al. ................ 399/200

* cited by examiner

*Primary Examiner* — William C Choi
(74) *Attorney, Agent, or Firm* — Harness, Dickey & Pierce, P.L.C.

(57) ABSTRACT

Disclosed herein is a zoom lens module that may include a first zoom lens group on an optical axis, a second zoom lens group on the optical axis, and a first driving unit configured to move at least one of the first zoom lens group and the second zoom lens group to vary a distance between the first zoom lens group and the second zoom lens group. In the disclosure, the first driving unit may include a first driving motor, a screw member on a rotary shaft of the first driving motor, and a first wire member connecting the screw member to one of the first zoom lens group and the second zoom lens group.

17 Claims, 7 Drawing Sheets

ZOOM LENS MODULE

CROSS-REFERENCE TO RELATED APPLICATION

This application claims priority under 35 U.S.C. §119 to Korean Patent Application No. 2009-0031835, filed on Apr. 13, 2009 in the Korean Intellectual Property Office (KIPO), the entire contents of which are incorporated herein by reference.

BACKGROUND

1. Field

Example embodiments relate to a zoom lens module mounted on a portable terminal.

2. Description of the Related Art

Portable terminals, for example, personal digital assistants (PDAs) or mobile terminals, have increasingly come into wide use. These portable terminals have a high-grade camera module having a zoom function and an auto focus function according to customer's requirements.

The zoom function refers to a function in which the focal length of a lens is varied and thus the size of an image of a subject for photography produced on an image sensor is varied. Further, the auto focus function refers to a function in which a distance between a lens and an image sensor is adjusted or the curvature of the lens is varied and thus an image of a subject for photography is most clearly produced on the image sensor.

A lens module having the above-described two functions including the zoom function and the auto focus function, i.e., a zoom lens module, generally includes at least two lens groups, and adjusts a distance between the at least two lens groups, thus embodying the zoom function.

Such a zoom lens module has a structure including mechanical components, such as a gear, a screw member, and a clip member, to convert a rotary motion of a driving source into a rectilinear motion of the lens group, and a cam member to achieve the interlocking movements of the at least two lens groups.

However, the above zoom lens module has the above-described plural mechanical components to vary the distance between the respective lens groups, and thus has an increased volume and a relatively long assembly time.

SUMMARY

Example embodiments provide a zoom lens module which has a relatively simple configuration to reduce a volume thereof.

Example embodiments will be set forth in part in the description which follows and, in part, will be obvious from the description, or may be learned by practice of example embodiments.

In accordance with example embodiments, a zoom lens module may include a first zoom lens group on an optical axis, a second zoom lens group on the optical axis, and a first driving unit configured to move at least one of the first zoom lens group and the second zoom lens group to vary a distance between the first zoom lens group and the second zoom lens group. In example embodiments, the first driving unit may include a first driving motor, a screw member on a rotary shaft of the first driving motor, and a first wire member connecting the screw member to one of the first zoom lens group and the second zoom lens group.

In accordance with example embodiments, a zoom lens module may include at least two zoom lens groups disposed on the same optical axis, and a driving unit to move at least one of the at least two zoom lens groups to vary a distance between the respective zoom lens groups. In example embodiments, the driving unit includes a driving motor, a screw member on a rotary shaft of the driving motor, and a wire member connecting the screw member and the at least one of the at least two zoom lens groups.

The wire member may be wound on the screw member to move the at least one of the at least two zoom lens groups when the rotary shaft is rotated.

Each of the at least two zoom lens groups may include at least one lens, and a barrel to receive the at least one lens, and the wire member may be connected to the barrel.

The driving unit may further include an elastic member to elastically support the barrel, to which the wire member may be connected.

In accordance with example embodiments, a zoom lens module may include a first zoom lens group, a second zoom lens group installed on the same optical axis as the first zoom lens group, a first driving unit to move the first zoom lens group, and a second driving unit to move the second zoom lens groups. In example embodiments any one of the first and second driving units may include a driving motor, a screw member installed on a rotary shaft of the driving motor, and a wire member connecting the screw member and any one of the first and second zoom lens groups.

The wire member may be wound on the screw member to move the any one of the first and second zoom lens groups when rotary shaft is rotated by the driving motor.

Each of the zoom lens groups may include at least one lens, and a barrel to receive the at least one lens, and the wire member may be connected to the barrel of the any one of the first and second zoom lens groups.

The any one of the first and second driving units may include an elastic member to elastically support the barrel, to which the wire member may be connected.

The other one of the first and second driving units may include another driving motor, and a rotating cam member installed on a rotary shaft of the driving motor and provided with a spiral groove formed on the outer surface thereof, and a rotating cam boss connected with the spiral groove of the rotating cam member may be formed on the barrel of the other one of the first and second zoom lens groups.

In accordance with example embodiments, a zoom lens module may include a first zoom lens group, a second zoom lens group installed on the same optical axis as the first zoom lens group, and a driving unit to move the first and second zoom lens groups. In example embodiments the driving unit may include a driving motor, a screw member installed on a rotary shaft of the driving motor, and a first wire member and a second wire respectively connecting the screw member and the first and second zoom lens groups.

A first spiral groove and a second spiral groove, to which the first wire member and the second wire member are respectively connected, may be formed on the outer surface of the screw member to move the first and second zoom lens groups when the rotary shaft of the driving motor is rotated, and the first spiral groove and the second spiral groove may have different leads.

Each of the zoom lens groups may include at least one lens, and a barrel to receive the at least one lens, and the first and second wire members may be respectively connected to the barrels of the first and second zoom lens groups.

The driving unit may further include elastic members to elastically support the barrels, to which the first and second wire members may be respectively connected.

BRIEF DESCRIPTION OF THE DRAWINGS

Example embodiments will be more clearly understood from the following detailed description taken in conjunction with the accompanying drawings. FIGS. 1-5 represent non-limiting, example embodiments as described herein. In accordance with example embodiments:

FIG. 1 is a perspective view illustrating a zoom lens module in accordance with example embodiments;

FIG. 2 is a longitudinal-sectional view of the zoom lens module of FIG. 1;

FIG. 3 is an exploded perspective view of the zoom lens module of FIG. 1;

FIG. 5 is a perspective view illustrating a zoom lens module in accordance with example embodiments.

DETAILED DESCRIPTION

Figure 1:
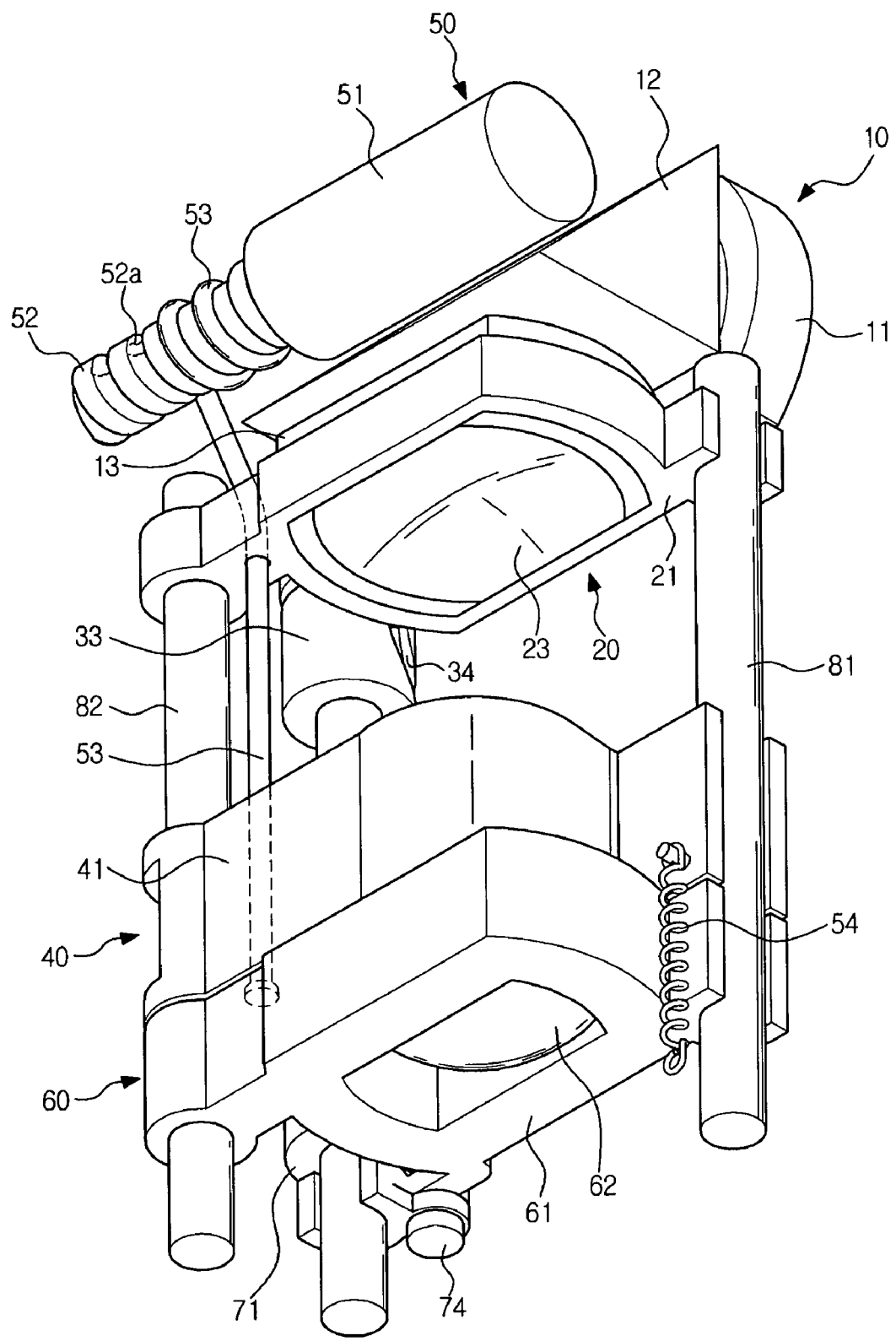

Example embodiments will now be described more fully with reference to the accompanying drawings, in which example embodiments are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on", "connected to", or "coupled to" another element or layer, it can be directly on, connected to, or coupled to the other element or layer or intervening elements or layers that may be present. In contrast, when an element is referred to as being "directly on", "directly connected to", or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. Thus, a first element, component, region, layer, or section discussed below could be termed a second element, component, region, layer, or section without departing from the teachings of example embodiments.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Example embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configuration formed on the basis of manufacturing processes. Therefore, regions exemplified in figures have schematic properties and shapes of regions shown in figures exemplify specific shapes or regions of elements, and do not limit example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Reference will now be made in detail to example embodiments which are illustrated in the accompanying drawings, wherein like reference numerals refer to like elements throughout.

Hereinafter, a zoom lens module in accordance with example embodiments will be described in detail with reference to the accompanying drawings.

Figure 2:
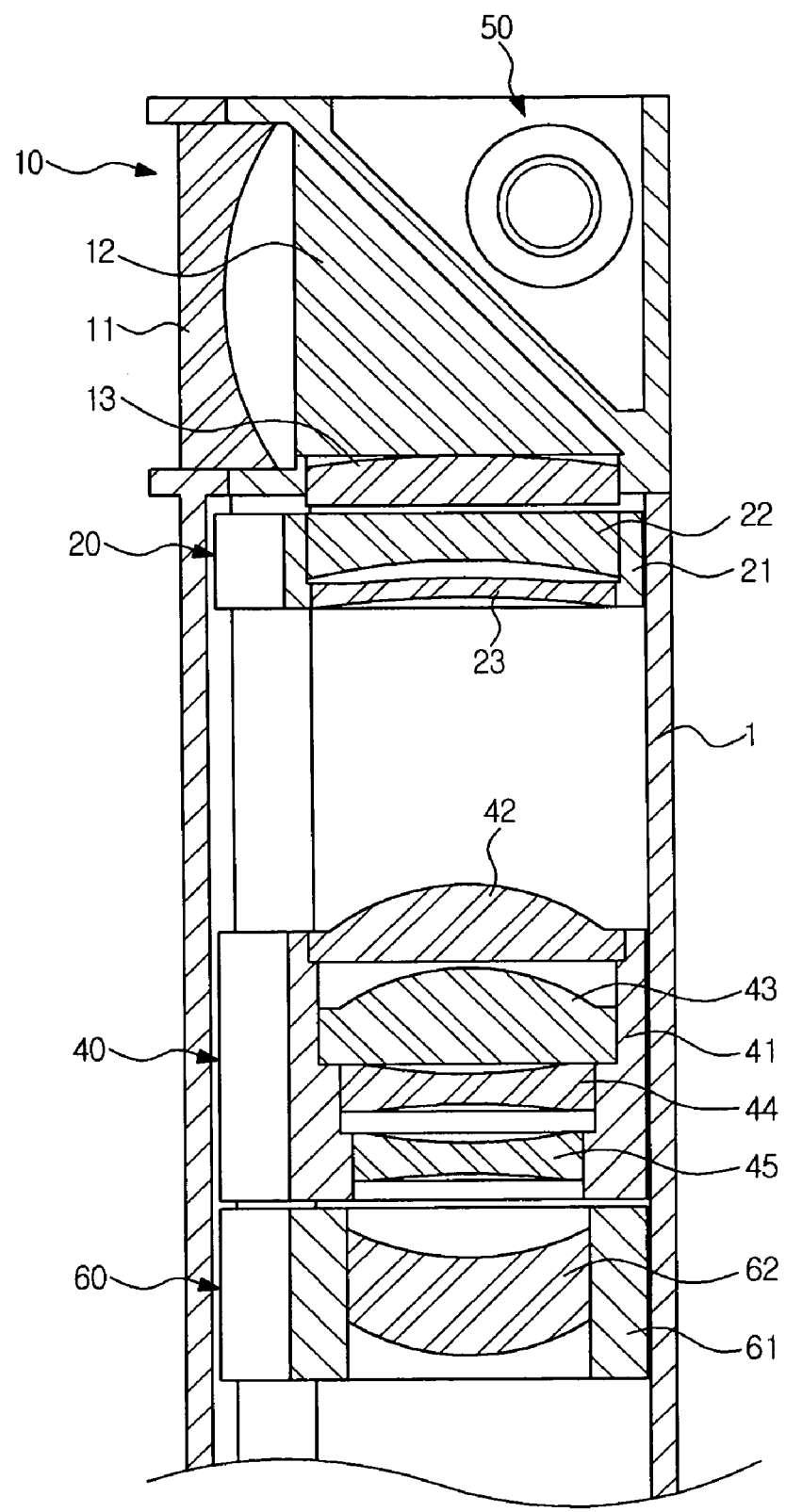
Figure 3:
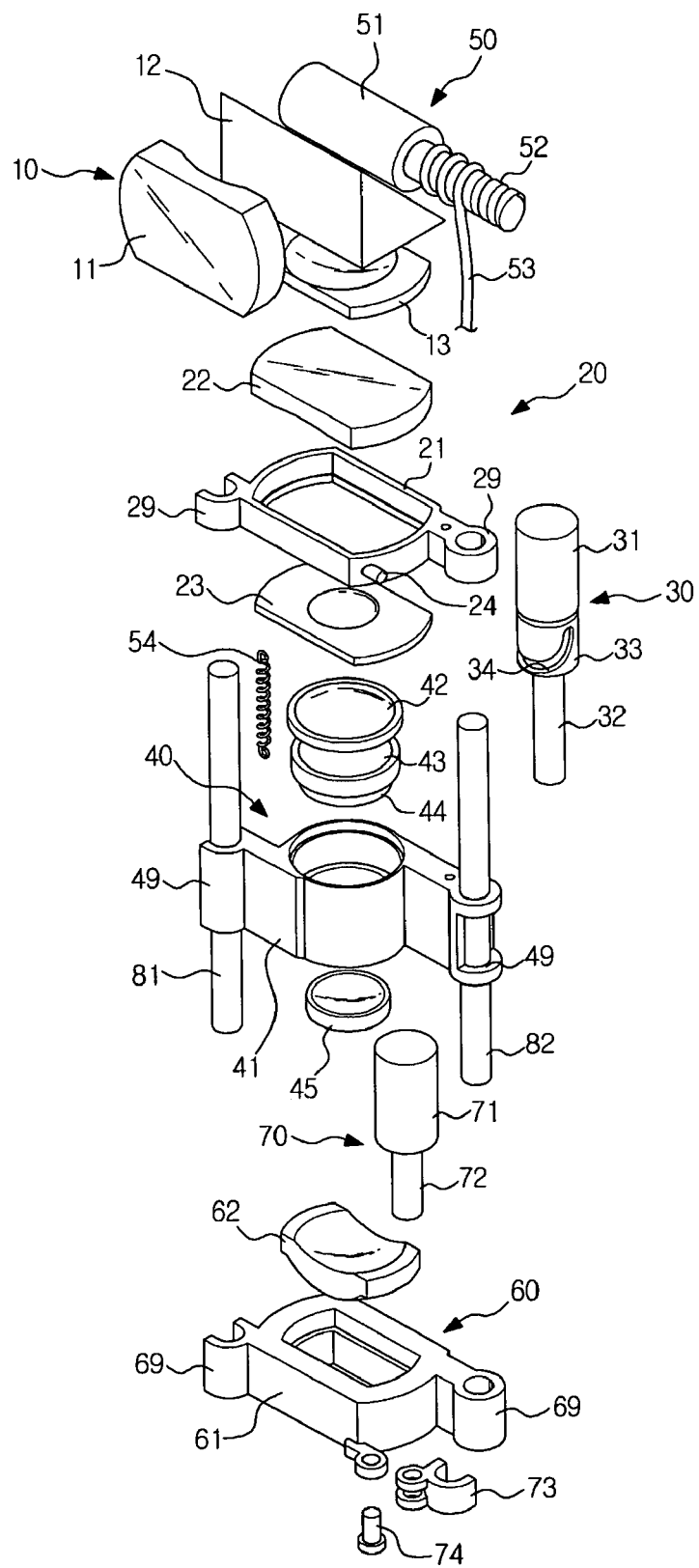

With reference to FIGS. 1 to 3, the zoom lens module in accordance with example embodiments may include a frame 1, and lens groups installed in the frame 1. The lens groups may include a fixed lens group 10, a first zoom lens group 20, a second zoom lens group 40, and a third zoom lens group 60, into which image light from a subject for photography is sequentially incident. The zoom lens module may further include first and second driving units 30 and 50 respectively moving the first and second zoom lens groups 20 and 40 to vary a distance between the respective zoom lens groups 20 and 40 and thus achieve the zoom function. The zoom lens module may further include a third driving unit 70 configured to move the third zoom lens group 60 to achieve the auto focus function.

The fixed lens groups 10 may include a first lens 11 disposed opposite the subject such that the image light from the subject is incident upon the first lens 11, a prism 12 to refract the image light incident through the first lens 11, and a second lens 13, upon which the image light refracted by the prism 12 is incident.

The first zoom lens group 20 may include a first barrel 21, and at least one lens 22 and 23 received in the first barrel 21. The first zoom lens group 20 may be disposed in the direction of a first optical axis, upon which the image light refracted by the prism 12 is incident.

The first driving unit 30 may be configured to move the first zoom lens group 20. As shown in FIGS. 1 and 3, the first driving unit 30 may be disposed at one side of the first zoom lens group 20. The first driving unit 30 may include a first driving motor 31, a rotating cam member 33 installed on a rotary shaft 32 of the first driving motor 31. The rotating cam member 33 may include a spiral groove 34 formed on an outer surface thereof. The spiral groove 34 may be configured to engage a rotating cam boss 24 protruding from the first barrel 21 to move the first lens group 20 along the first optical axis.

Figure 4A:
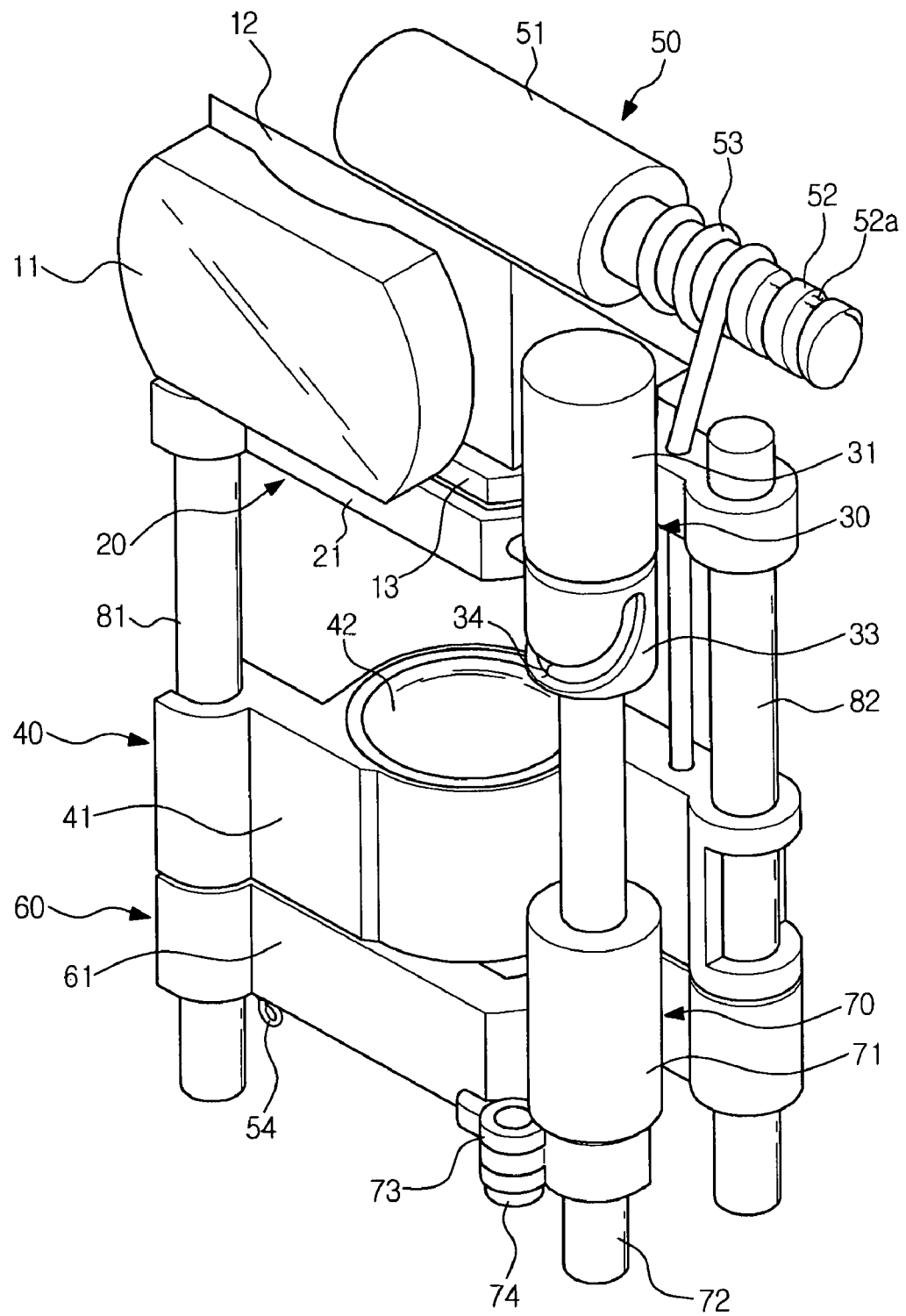
FIGS. 4A to 4C are views sequentially illustrating a wide angle mode, a middle angle mode, and a tele mode of the zoom lens module.
Figure 4B:
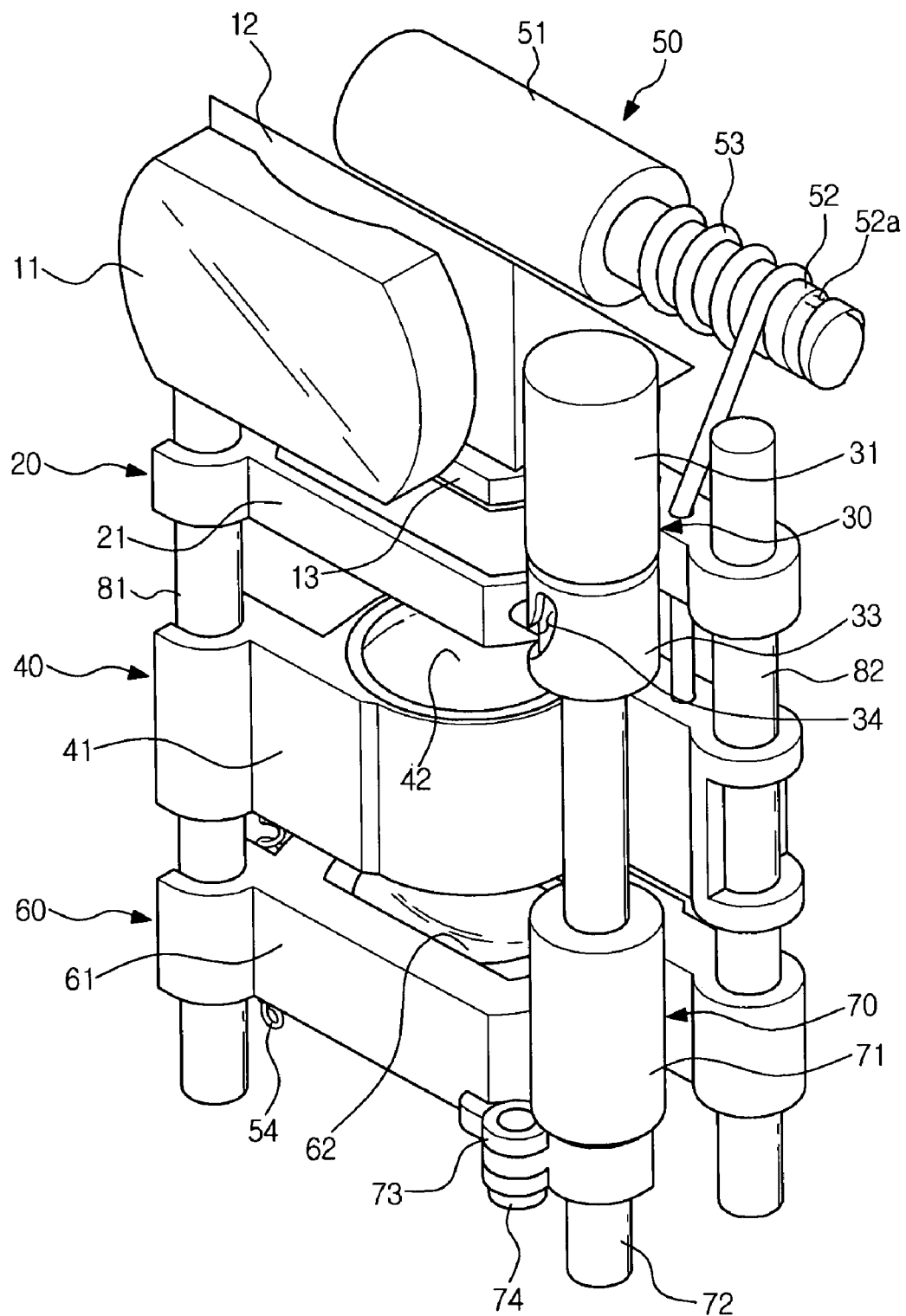
Figure 4C:
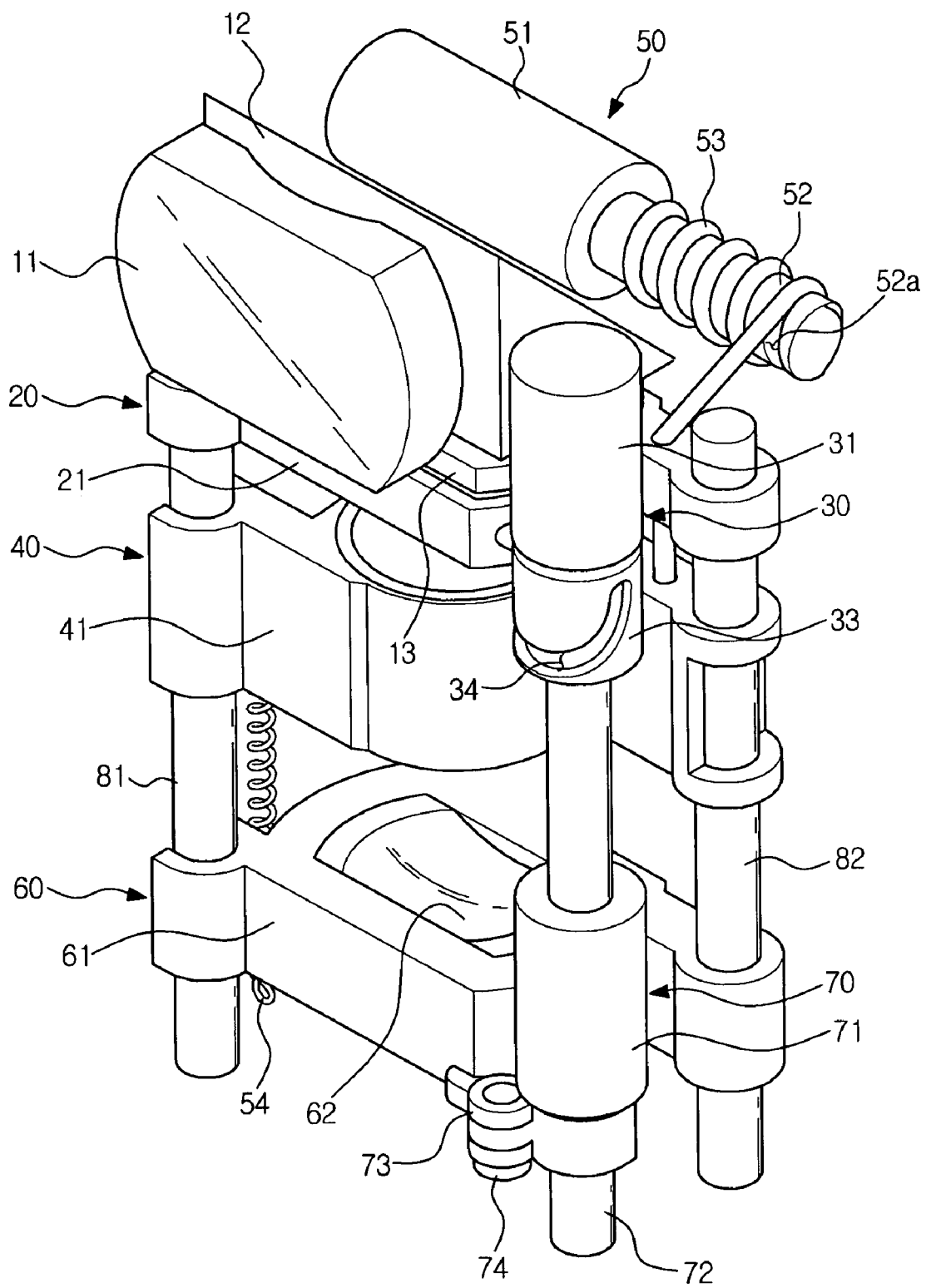

In example embodiments, the rotating cam member 33 may be rotated during a rotation of the first driving motor 31 and the rotating cam boss 24 engaged with the rotating cam member 33 may be displaced by the rotation of the rotating cam member 33. Accordingly, the first zoom lens group 20 may reciprocate in the direction of the first optical axis. Accordingly, the first zoom lens group 20 may move toward the second zoom lens group 40 when the zoom lens module is zoomed from a wide angle mode to a middle angle mode, and moves toward the fixed lens group 10 when the zoom lens module is zoomed from the middle angle mode to a tele mode (with reference to FIGS. 4A to 4C).

The second zoom lens group 40 may include a second barrel 41, and at least one lens 42, 43, 44, and 45 received in the second barrel 41. The second zoom lens group 40 may be disposed in the direction of the first optical axis equally with the first zoom lens group 20.

The second driving unit 50 may be configured to move the second zoom lens group 40. The second driving unit 50 may include a second driving motor 51, a screw member 52 installed on a rotary shaft of the second driving motor 51. The screw member 52 may be provided with a spiral groove 52a formed on an outer surface thereof. In example embodiments, a wire member 53 may connect the screw member 52 and the second barrel 41. In example embodiments, an elastic member 54 may be provided to elastically support the second barrel 41.

In example embodiments the zoom lens module may be zoomed from the wide angle mode to the tele mode via the middle angle mode. For example, the screw member 52 may be first rotated by the second driving motor 51 and the wire member 53 may be wound on the spiral groove 52a of the screw member 52 by the rotation of the screw member 52. Thus, the second zoom lens group 40 may move toward a positive side in the direction of the first optical axis. In example embodiments, the zoom lens module may also be zoomed from the tele mode to the wide angle mode via the middle angle mode. For example, the screw member 52 may be rotated by the second driving motor 51 and the wire member 53 wound on the spiral groove 52a of the screw member 52 may be unwound from the spiral groove 52a, and thus the second zoom lens group 40 may move toward a negative side in the direction of the first optical axis by the restoring force of the elastic member 54 elastically supporting the second barrel 41 (with reference to FIGS. 4A to 4C).

The third lens group 60 may perform an auto focus function, as described above, and may include a third barrel 61, and at least one lens 62 received in the third barrel 61. The third driving unit 70 may be configured to move the third zoom lens group 60. In example embodiment, the third driving unit 70 may include a third driving motor 71 and a clip member 73 connected to a rotary shaft 72 of the third driving motor 71 to convert the rotary motion of the third driving motor 71 into a rectilinear motion by a clip shaft 74.

The zoom lens module may further include guide shafts 81 and 82 to guide the first, second, and third zoom lens groups 20, 40, and 60 in the direction of the first optical axis. The guide shafts 81 and 82 may be disposed in the direction of the first optical axis. As shown in FIGS. 1 and 3, the guide shafts 81 and 82 may pass through support parts 29, 49, and 69 respectively formed through the respective barrels 21, 41, and 61 of the first, second, and third lens groups 20, 40, and 60, as shown in the drawings.

Figure 5:
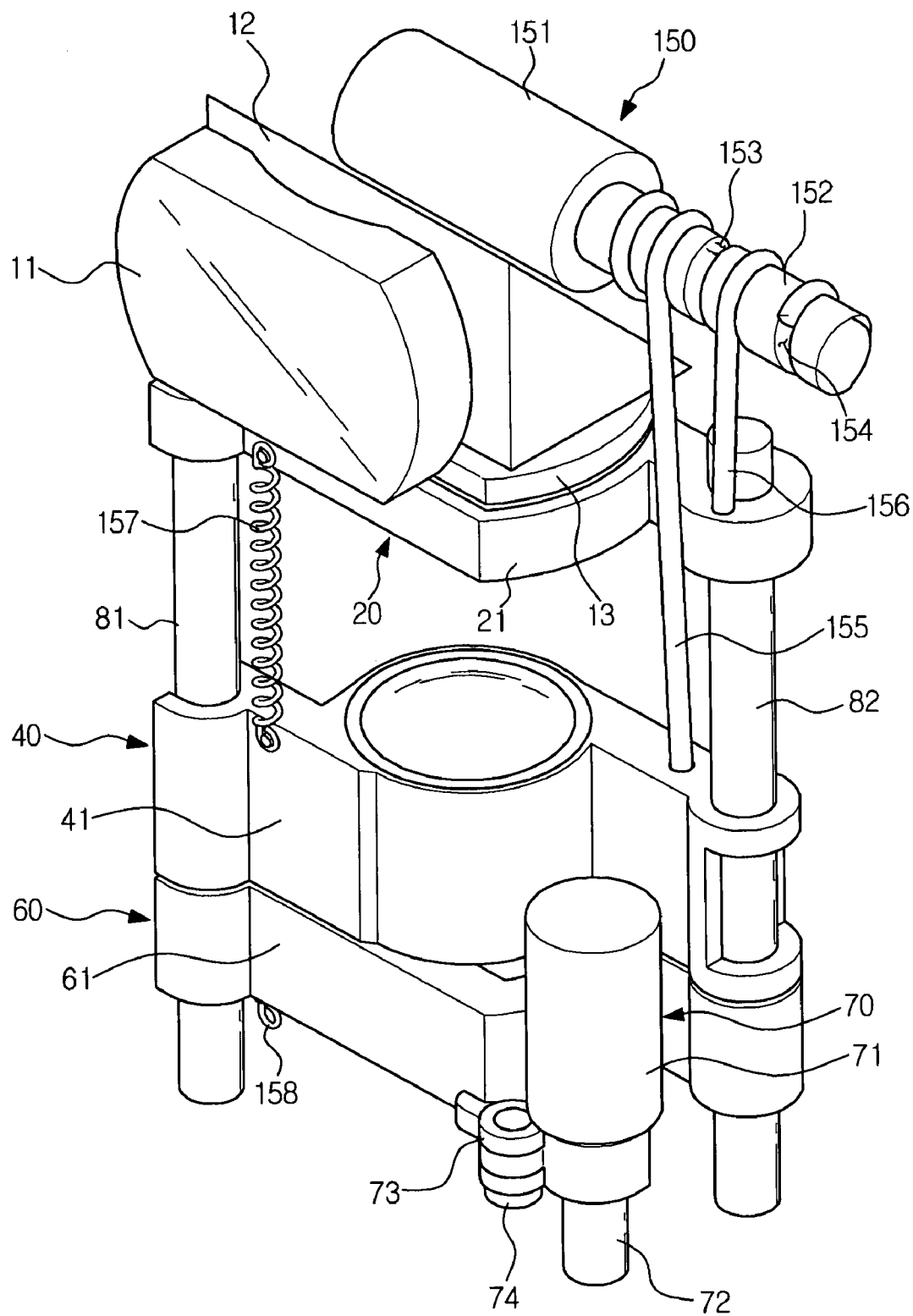

A zoom lens module in accordance with example embodiments will be described with reference to FIG. 5. Some parts of the zoom lens module illustrated in FIG. 5 are substantially the same as those of the zoom lens module illustrated in FIGS. 1-4. Accordingly, the like parts are denoted by the same reference numerals even though they are depicted in different drawings.

The zoom lens module illustrated in FIG. 5 may include a fixed lens group 10, a first zoom lens group 20, a second zoom lens group 40, and a third zoom lens group 60, into which image light from a subject for photography is sequentially incident. The zoom lens module illustrate in FIG. 5 may also include a driving unit 150 and another driving unit 70. The driving unit 150 may be configured to move the first and second zoom lens groups 20 and 40 to vary a distance between the respective zoom lens groups 20 and 40 and thus achieve the zoom function. The driving unit 70 may be configured to move the third zoom lens group 60 to achieve an auto focus function.

The fixed lens group 10, the first, second, and third zoom lens groups 20, 40, and 60, and the driving unit 70 in zoom lens module illustrated in FIG. 5 may be the same as those illustrated in FIGS. 1-3, thus a detailed description thereof will be omitted for the sake of brevity.

The driving unit 150 may include a driving motor 151 and a screw member 152 installed on a rotary shaft of the driving motor 151. The driving unit 150 may also include a first wire member 155 and a second wire member 156 respectively connecting the screw member 152 to the barrels 21 and 41 of the first and second zoom lens groups 20 and 40. Barrels 21 and 41 of the first and second lens groups 20 and 40 may be elastically supported by elastic members 157 and 158 attached thereto.

The first wire member 155 and the second wire member 156 may be simultaneously connected to the screw member 152, as described above. As shown in FIG. 5, the screw member 152 may include a first spiral groove 153 and a second spiral groove 154 formed on an outer surface thereof. In example embodiments, the first wire member 155 may be engaged with the first spiral groove 153 and the second wire member 156 may be engaged with the second spiral groove 154.

The first zoom lens group 20 may be connected with the second wire member 156 and the second zoom lens group 40 may be connected with the first wire member 155. In example embodiments, the first spiral groove 153 and the second spiral groove 154 may have different leads. Accordingly, each of the first zoom lens group 20 and the second zoom lens group 40 may have different moving distances when the zoom lens module is zoomed.

In example embodiments, the zoom lens module may be zoomed from the wide angle mode to the tele mode via the middle angle mode. For example, the screw member 152 may be rotated by the driving motor 151 and the first and second wire members 155 and 156 may be respectively wound on the spiral grooves 153 and 154 of the screw member 152 by the rotation of the screw member 152. Thus, the first and second zoom lens groups 20 and 40 may move toward a positive side in the direction of the first optical axis.

In example embodiments, the zoom lens module may be zoomed from the tele mode to the wide angle mode via the middle angle mode. For example, the screw member 152 may be rotated by the driving motor 151 and the first and second wire members 155 and 156 wound on the spiral grooves 153 and 154 of the screw member 152 are respectively unwound from the spiral grooves 153 and 154. Thus, the first and second zoom lens groups 20 and 40 may move toward a negative side in the direction of the first optical axis by the restoring force of the elastic members 157 and 158 elastically supporting the first and second barrels 21 and 41.

As is apparent from the above description, the zoom lens module in accordance with example embodiments may move at least one of the respective lens groups through the driving units, each of which includes a driving motor, a screw member rotated by the driving motor, and a wire member connecting the screw member and the barrel of the corresponding zoom lens group, thus having a simple structure and reducing a volume thereof.

Although example embodiments have been shown and described, it would be appreciated by those skilled in the art that changes may be made in example embodiments without departing from the principles and spirit of the invention, the scope of which is defined in the claims and their equivalents.

What is claimed is:

1. A zoom lens module comprising:
   a first zoom lens group on an optical axis;
   a second zoom lens group on the optical axis; and
   a first driving unit configured to move at least one of the first zoom lens group and the second zoom lens group to vary a distance between the first zoom lens group and the second zoom lens group,
   wherein the first driving unit includes a first driving motor, a screw member on a rotary shaft of the first driving motor, and a first wire member connecting the screw member to one of the first zoom lens group and the second zoom lens group.

2. The zoom lens module according to claim 1, wherein the first wire member is wound on the screw member to move at least one of the first zoom lens group and the second zoom lens group when the rotary shaft is rotated.

3. The zoom lens module according to claim 2, wherein
   each of the first zoom lens group and the second zoom lens group includes a barrel receiving at least one lens, and
   the first wire member is connected to one of the barrels of the first zoom lens group and the second zoom lens group.

4. The zoom lens module according to claim 3, wherein the first driving unit further includes an elastic member elastically supporting the barrel connected to the first wire member.

5. The zoom lens module according to claim 1, wherein the first driving unit is configured to move both of the first zoom lens group and the second zoom lens group.

6. The zoom lens module according to claim 5, wherein
   the first driving unit further includes a second wire member, and
   the first wire member connects the first zoom lens group to the screw member and the second wire member connects the second zoom lens group to the screw member.

7. The zoom lens module according to claim 6, wherein the first wire member and the second wire member are wound on the screw member to move the first zoom lens group and the second zoom lens group when the first rotary shaft is rotated.

8. The zoom lens module according to claim 7, wherein the screw member includes
   a first spiral groove on an outside surface of the screw member, the first spiral groove configured to engage the first wire member, and
   a second spiral groove on the outside surface of the screw member, the second spiral groove configured to engage the second wire member.

9. The zoom lens module according to claim 8, wherein the first spiral groove and the second spiral groove have different leads.

10. The zoom lens module according to claim 6, wherein
    each of the first zoom lens group and the second zoom lens group includes a barrel receiving at least one lens, and
    the first wire member is connected to the barrel of the first zoom lens group and the second wire member is connected to the barrel of the second zoom lens group.

11. The zoom lens module according to claim 10, further comprising:
    elastic members connected to the barrels of the first zoom lens group and the second zoom lens group to elastically support the barrels.

12. The zoom lens module according to claim 1, further comprising:
    a second driving unit, wherein the first driving unit is configured to move only one of the first zoom lens group and the second zoom lens group and the second driving unit is configured to move the other of the first zoom lens group and the second zoom lens group.

13. The zoom lens module according to claim 12, wherein
    each of the first zoom lens group and the second zoom lens group includes a barrel receiving at least one lens and one of the barrels includes a rotating cam boss, and
    the second driving unit includes a second driving motor and a rotating cam attached to a rotary shaft of the second driving motor, the rotating cam being configured to rotate as the rotary shaft of the second driving unit rotates and being further configured to engage the rotating cam boss.

14. The zoom lens module according to claim 13, wherein the first wire member is wound on the screw member.

15. The zoom lens module according to claim 12, wherein the first wire member is wound on the screw member.

16. The zoom lens module according to claim 12, wherein
    each of the first zoom lens group and the second zoom lens group includes a barrel receiving at least one lens and one of the barrels includes a rotating cam boss,
    the second driving unit includes a second driving motor and a rotating cam attached to a rotary shaft of the second driving motor, the rotating cam being configured to rotate as the rotary shaft of the second driving unit rotates and being further configured to engage the rotating cam boss, and
    the first wire member is attached to the barrel that does not include the rotating cam boss.

17. The zoom lens module according to claim 16, wherein the first driving unit further includes an elastic member elastically supporting the barrel connected to the first wire.

* * * * *